United States Patent
Kowalski

[15] 3,671,447
[45] June 20, 1972

[54] METHODS OF SCALE INHIBITION USING SUBSTOICHIOMETRIC AMOUNTS OF AMINO ALCHOLS

[72] Inventor: Xavier Kowalski, Creve Coeur, Mo.
[73] Assignee: Monsanto Company, St. Louis, Mo.
[22] Filed: July 27, 1970
[21] Appl. No.: 58,705

[52] U.S. Cl.....................252/180, 21/2.7, 134/2, 210/58, 252/80, 252/82, 252/86, 252/181
[51] Int. Cl............................................C02b 5/06
[58] Field of Search..............252/180, 80, 82, 86, 175, 181, 252/117, 152, 156; 210/58, 59; 21/2.7; 134/2

[56] References Cited

UNITED STATES PATENTS

| | | | |
|---|---|---|---|
| 2,915,444 | 12/1959 | Meyer | 252/156 X |
| 2,544,649 | 3/1951 | Bersworth | 252/180 X |
| 3,368,913 | 2/1968 | Ziehr | 252/156 X |

*Primary Examiner*—John T. Goolkasian
*Assistant Examiner*—M. E. McCamish
*Attorney*—Herbert B. Roberts, James J. Mullen and Neal E. Willis

[57] ABSTRACT

The precipitation of scale-forming materials in an aqueous system is inhibited by adding substoichiometric amounts of an amino alcohol such as triethanolamine to said system.

10 Claims, No Drawings

METHODS OF SCALE INHIBITION USING SUBSTOICHIOMETRIC AMOUNTS OF AMINO ALCHOLS

This invention relates to methods for inhibiting the precipitation of metal ions from aqueous solutions, and more particularly, to the use of certain amino alcohols to accomplish this purpose.

Most commercial water contains alkaline earth metal cations, such as calcium, barium, magnesium, and transition metals such as iron or copper, etc., and several anions such as bicarbonate, carbonate, sulfate, oxalate, phosphate, silicate, fluoride, hydroxides, etc. When combinations of these anions and cations are present in concentrations which exceed the solubility of their reaction products, precipitates form until their reaction solubility product concentrations are no longer exceeded. For example, when the concentrations of calcium ion and sulfate ion exceed the solubility of the calcium sulfate, a solid phase of calcium sulfate will form. Similarly an iron hydroxy material will form and precipitate.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying system, they form scale. The scale prevents effective heat transfer, interferes with fluid flow, facilitates corrosive processes, and harbors bacteria. The presence of this scale is an expensive problem in many industrial water systems, oilwells, and the like, causing delays and shutdowns for cleaning and removal.

Scale-forming compounds or materials can be prevented from precipitating by inactivating their cations with chelating or sequestering agents, so that the solubility of their reaction products is not exceeded. Generally, this requires many times as much chelating or sequestering agent as cation, and these amounts are not always desirable or economical.

More than 25 years ago it was discovered that certain inorganic polyphosphates would prevent such precipitation when added in amounts less than the concentrations needed for sequestering or chelating. See, for example, Hatch and Rice, *Industrial Engineering Chemistry*, vol. 31, pages 51 and 53; Reitemeier and Buehrer, *Journal of Physical Chemistry*, vol. 44, No. 5, pages 535 and 536 (May 1940); Fink and Richardson U.S. Pat. No. 2,358,222; and Hatch U.S. Pat. No. 2,539,305, all of which are incorporated herein by reference. For sequestration, the mole ratio of precipitation inhibitor equivalents to scale forming cation is usually 0.5:1 to 1:1 or greater (2:1, 3:1, etc.). These ratios are referred to as stoichiometric. The present invention is concerned with substoichiometric amounts of a precipitation inhibitor. Substoichiometric amounts would include all mole ratios of precipitation inhibitor equivalent to scale forming cation that are less than the level required for sequestration. The use of substoichiometric amounts in the water treating art is generally referred to as the "threshold" treatment of water; note U.S. Pat. No. 3,336,221 which is incorporated herein by reference.

The substoichiometric concentration range can be demonstrated in the following manner. When a typical scale-forming solution containing the cation of a relatively insoluble compound is added to a solution containing the anion of the relatively insoluble compound and a very small amount of a substoichiometric active inhibitor, the relatively insoluble compound will not precipitate even when its normal equilibrium concentration has been exceeded.

The polyphosphates are generally effective substoichiometric precipitation inhibitors for many scale-forming compounds. After prolonged periods at higher temperatures, however, they lose their effectiveness. In an acid solution, they revert to ineffective or less effective compounds.

Accordingly, an object of this invention is to provide a method for inhibiting the precipitation of metal ions from aqueous solutions.

Another object of this invention is to provide a precipitation inhibitor which is effective in inhibiting the precipitation of heavy metal ions in alkaline aqueous solutions.

A still further object of this invention is to provide a precipitation inhibitor which is effective, when used in threshold amounts, in inhibiting the precipitation of iron ions in alkaline solutions.

Other objects will become apparent from a reading of the following detailed description and appended claims.

It has been found that certain amino alcohols, i.e., mono-, di- and triethanolamine; mono-, di- and tris-isopropylamine; mono- and di-isobutanolamine; butanolamine; dibutyl amino ethyl alcohol; dibutyl amino propyl alcohol; dibutyl amino isopropyl alcohol; bis(2-hydroxyethyl) butyl amine; butyl ethyl 2,2' dihydroxy amine; dibutyl ethyl 2,2',2" trihydroxy amine; bis(2-hydroxyethyl) methyl amine and dipropyl ethyl 2,2',2"trihydroxy amine, unexpectedly function as superior precipitation inhibitors when used in substoichiometric concentrations, i.e., in "threshold amounts." The preferred amino alcohol for use in this invention is triethanolamine.

It has also been found that these amino alcohols are quite effective precipitation inhibitors when used in "threshold" amounts in aqueous solutions containing iron ions, particularly in aqueous alkaline solutions containing iron ions and calcium and magnesium ions. In the aqueous alkaline solutions, the pH is usually above 6.0, generally in the range of 6.5 to 12.

The precipitation inhibitors of the instant invention exhibit, in addition to their scale preventing ability, the highly beneficial properties of being highly water soluble and hydrolytically stable, that is, having a substantial resistance to hydrolysis or degradation under various pH and temperature conditions.

Although the precipitation inhibitors of the present invention are of general utility whenever it is desired to inhibit the precipitation of metal ions from aqueous solutions, they are especially effective in such applications as liquid soaps and shampoos, bar soaps, scouring wool cloth, cotton kier boiling, cotton dyeing, cotton bleaching, metal cleaning compounds, rubber and plastics trace metal contamination (compounding and polymerization), pulp and paper trace metal contamination, toilet bowl cleaners, disinfectants, and dispersants.

The amount of the precipitation inhibitor, i.e., amino alcohol, necessary to be effective varies with, inter alia, the type and amount of problem metal ions, pH conditions, temperature and the like, but in all cases, substoichiometric (threshold) amounts are used. The mole ratio of the precipitation inhibitor to the scale forming cation material is generally greater than about 1:2 and preferably from about 1:2.5 to about 1:10,000.

The amino alcohols work quite effectively in the range of 0.1 to 500 parts per million parts of total solution when, for example, the iron concentration is present in the range from 2,100 to greater than 15,000 parts per million.

It is of interest to note that a large percentage of sequestering agents (stoichiometric precipitation inhibitors) do not work effectively when used in substoichiometric amounts. Examples of the latter class are ethylene diamine tetramine, nitrilotriacetic acid and salts, and gluconic acid. However, the present invention amino alcohols are unexpectedly just as effective as other compounds which have been used as threshold agents, such as amino tri(methylene phosphonic acid), 1-hydroxy ethylidene-1,1-diphosphonic acid, and sodium tripolyphosphate. Also, there are many alcohols and diols which do not work at all, e.g., phosphorylated ethane diol, phosphorylated 1,4-n-butane diol, and $H_2O_3PO(CH_2)_2O(CH_2)_2OPO_3H_2$.

The following examples are included to illustrate the practice of the invention and the advantages provided thereby but are not to be considered limiting. Unless otherwise specified, all parts are parts by weight and all temperatures are in degrees centigrade.

EXAMPLE I

In order to demonstrate the unique properties of the amino alcohols, the following procedure is carried out. Measured volumes of concentrated $NaHCO_3$ and $Na_2SO_4$ are individually and separately added to solutions containing calcium chloride and the desired amino alcohol, which is indicated by the reference number in the first column of Table I. The temperature of the resultant solutions and the pH are also shown in Table I. The time necessary for visual observation of significant amounts of precipitate is called the "Time to Failure." In conjunction with the calcium sulfate studies, the $CaCl_2$-NaCl-amino alcohol solutions are heated to 95° C. in reflux before the sodium sulfate is added. The results of these tests are set forth in Table I.

In conjunction with the results set forth in Table I, the "blank" additive did not contain any amino alcohol and consequently is utilized as a control. The amino alcohol additives are indicated by the reference numbers 1 through 5. The utilization of the particular amino alcohol additives is vividly demonstrated in that the use of these additives as shown above results in a 6-fold to a 1,000-fold value effectiveness as a precipitation inhibitor as compared to no inhibitor. The utility of these precipitation inhibitors thus is uniquely demonstrated.

EXAMPLE II

The above Example I is repeated several times with the concentration of the specific amino alcohol additive being respectively 25 ppm, 100 ppm, 200 ppm and 500 ppm. The results utilizing these different concentrations (than that set forth in Example I) are similar to the results obtained in Example I.

EXAMPLE III

In order to demonstrate the effectiveness of triethanolamine as a threshold agent in treating iron ion-containing water (which also contains calcium and magnesium ions), the following procedure is carried out.

Measured amounts of the precipitation inhibitor as indicated in Table II are added to a 500 milliliter beaker containing 300 milliliters of water at 25° C. in order to prepare the indicated concentrations. The pH of each solution is adjusted to pH 10 by adding sodium hydroxide. In sequential order, measured amounts of calcium chloride, magnesium chloride and ferric chloride are added with stirring to each alkaline solution in order to provide a resultant solution with the indicated molar ratios. The time necessary for visual observation of significant amounts of precipitate is called the "Time to Failure." These times are recorded and shown in Table II.

In conjunction with the results set forth in Table II, the "blank" solution did not contain any precipitation inhibitor and consequently is used as a control. The first three solutions, after the blank, contained the present invention precipitation inhibitor triethanolamine, but in different concentrations. The three remaining solutions contained the well known threshold agents 1 hydroxy ethylidene-1,1-diphosphonic acid (HEDP) (2 and 4 ppm respectively) and amino tri(methylene phosphonic acid) (ATMP); note U.S. Pat. No. 3,214,454 and U.S. Pat. No. 3,336,221, respectively (both of these patents are incorporated herein by reference).

The results of this Example III are readily seen. The triethanolamine (TEA) exhibited a substantial effectiveness as a threshold agent for inhibiting the precipitation of iron as compared to the blank or "control." Furthermore, this amino alcohol (TEA) demonstrated that it is as effective or more effective (on a comparative basis) as the well known threshold agents HEDP and ATMP in conjunction with the prevention of the precipitation of iron from aqueous alkaline solutions containing calcium and magnesium ions.

The foregoing examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

TABLE II.—TRIETHANOLAMINE VERSUS ORGANOPHOSPHORUS PRODUCTS AS THRESHOLD AGENTS

| Precipitation inhibitor, PPI | P.p.m. in solution [1] | Moles in solution [2] | Molar ratios | | | Time to failure, min. |
|---|---|---|---|---|---|---|
| | | | $CaCl_2$:PI | $MgCl_2$:PI | $FeCl_3$:PI | |
| Blank | 0 | 0 | | | | 0 |
| Triethanolamine | 1 | $6.7 \times 10^{-6}$ | 45.52:1 | 29.29:1 | 26.66:1 | 30 |
| Do | 2 | $13.4 \times 10^{-6}$ | 22.76:1 | 14.63:1 | 13.33:1 | 70 |
| Do | 4 | $26.8 \times 10^{-6}$ | 11.38:1 | 7.32:1 | 6.66:1 | 75 |
| HEDP [3] | 2 | $9.7 \times 10^{-6}$ | 31.44:1 | 20.21:1 | 18.45:1 | 40 |
| HEDP [3] | 4 | $19.4 \times 10^{-6}$ | 15.72:1 | 10.11:1 | 9.23:1 | 50 |
| ATMP [4] | 2 | $6.7 \times 10^{-6}$ | 45.59:1 | 29.29:1 | 26.72:1 | 0 |

[1] Parts of precipitation inhibitor on a 100% active basis per one million parts of solution.
[2] Moles of precipitation inhibitor in solution.
[3] 1-hydroxy ethylidene-1,1-diphosphonic acid.
[4] Amino tri(methylene phosphonic acid).

TABLE I.—AMINO ALCOHOLS AS PRECIPITATION INHIBITORS

| Additive (Ref. No.) | Additive | Time to failure | | | |
|---|---|---|---|---|---|
| | | $CaCO_3$ (6,500 p.p.m.) 25° C., pH=7 2 p.p.m. additive | $CaCO_3$ (400 p.p.m.) 25° C., pH=10 2 p.p.m. additive | $CaSO_4$ (6,500 p.p.m.) 25° C., pH=7 2 p.p.m. additive | $CaSO_4$ (8,500 p.p.m.) 95° C., pH=7.5 2.7 p.p.m. additive |
| | Blank | <4 min | <6 min | <1 hr | <5 min |
| 1 | Triethanolamine | 3 days | 2 days | 14 days | 60 min |
| 2 | Tris-isopropylamine | 3 days | 3 days | 8 days | 60 min |
| 3 | Butanolamine | 4 days | 2 days | 5 days | 60 min |
| 4 | Dibutyl amino propyl alcohol | 3 days | 2 days | 3 days | 90 min |
| 5 | Bis(2-hydroxyethyl) methyl amine | 3 days | 1 day | 7 days | 30 min |

1. A method of inhibiting the precipitation of scale-forming materials in an aqueous system comprising adding substoichiometric amounts of an amino alcohol to said system.

2. The method of claim 1 wherein the scale-forming material is selected from the group consisting of alkaline earth metal carbonates, sulfates, oxalates, phosphates, fluorides, silicates, transition metal hydroxides, or mixtures thereof.

3. The method of claim 1 wherein the mole ratio of precipitation inhibitor to scale-forming cation material is from about 1:2.5 to about 1:10,000.

4. The method of claim 1 wherein the amino alcohol is triethanolamine.

5. The method of claim 4 wherein the scale-forming material is an iron hydroxy compound.

6. The method of claim 4 wherein the precipitation inhibitor is present in the system at concentrations from about 0.1 part per million to about 500 parts per million.

7. A method of inhibiting the precipitation of iron hydroxy compounds in an alkaline aqueous system containing calcium and magnesium ions, comprising adding threshold amounts of triethanolamine to said system.

8. A method of claim 7 wherein the alkaline aqueous system has a pH of from about 6.5 to about 12.

9. The method of claim 8 wherein the mole ratio of triethanolamine to iron hydroxy compound is from about 1:2.5 to about 1:10,000.

10. The method of claim 8 wherein the triethanolamine is present in the system at concentrations from about 0.1 part per million to about 500 parts per million.

* * * * *